US010055694B2

(12) United States Patent
Ichinose et al.

(10) Patent No.: US 10,055,694 B2
(45) Date of Patent: Aug. 21, 2018

(54) USE-ASSISTING TOOL FOR AUTONOMOUS MOBILE DEVICE, OPERATION MANAGEMENT CENTER, OPERATION SYSTEM, AND AUTONOMOUS MOBILE DEVICE

(75) Inventors: Ryoko Ichinose, Tokyo (JP); Takashi Sato, Tokyo (JP); Ai Masuda, Tokyo (JP); Kenjiro Yamamoto, Tokyo (JP); Yukihiko Ono, Tokyo (JP); Akira Oshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 823 days.

(21) Appl. No.: 14/419,681

(22) PCT Filed: Aug. 7, 2012

(86) PCT No.: PCT/JP2012/070059
§ 371 (c)(1),
(2), (4) Date: Feb. 5, 2015

(87) PCT Pub. No.: WO2014/024254
PCT Pub. Date: Feb. 13, 2014

(65) Prior Publication Data
US 2015/0199619 A1    Jul. 16, 2015

(51) Int. Cl.
*G01C 22/00* (2006.01)
*G06Q 10/02* (2012.01)
(Continued)

(52) U.S. Cl.
CPC ......... *G06Q 10/02* (2013.01); *G01C 21/3469* (2013.01); *G05D 1/0022* (2013.01); *G05D 1/0217* (2013.01)

(58) Field of Classification Search
CPC ............. G01C 21/3469; G05D 1/0022; G05D 1/0217; G06Q 10/02
See application file for complete search history.

(56) References Cited

U.S. PATENT DOCUMENTS 8,073,614 B2 *  12/2011  Coughlin ............... G01C 21/20
                                                     701/300
8,682,363 B1 *   3/2014  Cardi .................... H04W 4/02
                                                     455/456.1
(Continued)

FOREIGN PATENT DOCUMENTS

JP     11-184521 A    7/1999
JP     2002-73758 A   3/2002
(Continued)

OTHER PUBLICATIONS

International Search Report (PCT/ISA/210) dated Sep. 4, 2012 with English translation (five pages).
(Continued)

*Primary Examiner* — Hussein Elchanti
(74) *Attorney, Agent, or Firm* — Crowell & Moring LLP

(57) ABSTRACT

Provided are: a use-assisting tool for an autonomous mobile device that enhances convenience for a user of the autonomous mobile device; an operation management center; an operation system; and an autonomous mobile device. The use-assisting tool for an autonomous mobile device provides assistance for using the autonomous mobile device, which travels autonomously along a route to a destination, and is characterized by: being provided with a communication means that communicates with an operation management center, an input means, and a display means; a destination to be visited using the autonomous mobile device being input by means of the input means; and the display means displaying cooperation information established at the destination that is transmitted from the operation management center. The cooperation information established at the destination includes information regarding securing a mobility means at the destination and establishing a reservation at the destination.

6 Claims, 8 Drawing Sheets

(51) Int. Cl.
*G01C 21/34* (2006.01)
*G05D 1/00* (2006.01)
*G05D 1/02* (2006.01)

(56) References Cited

U.S. PATENT DOCUMENTS

| | | | | |
|---|---|---|---|---|
| 9,810,543 | B2* | 11/2017 | Hoch | G01C 21/3469 |
| 2005/0228553 | A1* | 10/2005 | Tryon | B60K 6/46 |
| | | | | 701/22 |
| 2012/0065818 | A1* | 3/2012 | Haaf | B61L 3/006 |
| | | | | 701/20 |
| 2012/0330710 | A1* | 12/2012 | Hauser | G06Q 10/10 |
| | | | | 705/7.15 |
| 2013/0024561 | A1* | 1/2013 | Imai | H04W 40/08 |
| | | | | 709/224 |
| 2014/0052374 | A1* | 2/2014 | Hoch | G01C 21/343 |
| | | | | 701/533 |

FOREIGN PATENT DOCUMENTS

| | | |
|---|---|---|
| JP | 2002-352388 A | 12/2002 |
| JP | 2005-235079 A | 9/2005 |
| JP | 2005-316933 A | 11/2005 |
| JP | 2010-122988 A | 6/2010 |
| JP | 2010-237980 A | 10/2010 |
| JP | 2010-272103 A | 12/2010 |
| JP | 2011-65308 A | 3/2011 |
| JP | 2011-248660 A | 12/2011 |

OTHER PUBLICATIONS

Yamamoto et al. "Examples of Activities in the Background of the Field Test 'Tsukuba Challenge' and Autonomuos Mobile Technologies to Finish the Test" Joho Shori, Aug. 15, 2011, vol. 52, No. 9, pp. 1166-1169.

* cited by examiner

FIG. 2

| No. | SITE NAME | SITE COORDINATES | COOPERATION DEVICE/ INFORMATION | TIME REFLECTION |
|---|---|---|---|---|
| 1 | MIDORIGAOKA STATION | (341,546) | TRAIN BOARDING TIME: TRAIN DEPARTURE TIME | TRAIN DEPARTURE TIME → ALIGHTING TIME |
| | | | TRAIN ALIGHTING TIME: TRAIN ARRIVAL TIME | TRAIN ARRIVAL TIME → BOARDING TIME |
| | | | PICK-UP TIME: TRAIN ARRIVAL TIME | TRAIN ARRIVAL TIME → BOARDING TIME |
| 2 | TANAKA OPHTHALMOLOGY CLINIC | (422,216) | EXAMINATION APPOINTMENT | EXAMINATION APPOINTMENT TIME → BOARDING TIME |
| 3 | TOKYO HOSPITAL | (324,675) | EXAMINATION APPOINTMENT | EXAMINATION APPOINTMENT TIME → BOARDING TIME |
| | | | AUTONOMOUS MOBILE WHEELCHAIR RESERVATION | ALIGHTING TIME → WHEELCHAIR USAGE START TIME |
| 4 | ○ SUPERMARKET | (432,918) | AUTONOMOUS MOBILE CART RESERVATION | ALIGHTING TIME → CART USAGE START TIME |
| 5 | △ MUSEUM | (342,148) | COVER ATTACHING/ REMOVING MACHINE | ARRIVAL TIME → ATTACHING/REMOVING MACHINE USAGE START TIME |

| VEHICLE NO. | ENERGY CONSUMPTION CHARACTERISTICS | | |
|---|---|---|---|
| | DURING LOW SPEED | DURING HIGH SPEED | WHEN STOPPED |
| 1 | 0.34v/km | 0.38v/km | 0.11v/h |
| 2 | 0.32v/km | 0.38v/km | 0.13v/h |
| 3 | 0.34v/km | 0.37v/km | 0.12v/h |
| 4 | 0.31v/km | 0.36v/km | 0.12v/h |
| 5 | 0..35v/km | 0.37v/km | 0.11v/h |
| 6 | 0.34v/km | 0.39v/km | 0.11v/h |
| 7 | 0.33v/km | 0.38v/km | 0.13v/h |
| 8 | 0.34v/km | 0.38v/km | 0.11v/h |

| 400 VEHICLE No. | 501 CURRENT LOCATION *: ESTIMATED | 502 COMMUNICATION INTERRUPTION TIME [s] | 503 COMMUNICATION INTERRUPTION START LOCATION | 504 REMAINING ENERGY [v] | 505 STATE | 506 TRAVEL MODE | 507 SPEED SETTING | 508 SUBSEQUENT RESERVATION |
|---|---|---|---|---|---|---|---|---|
| 1 | (123,456) | 0 | — | 51.3 | WAITING | STOPPED | — | YES |
| 2 | *(324,162) | 70 | (334,171) | 49.9 | PICKING UP | AUTOMATIC | — | NO |
| 3 | (234,567) | 0 | — | 55.6 | WAITING FOR BOARDING | STOPPED | — | NO |
| 4 | (342,198) | 0 | — | 52.1 | IN USE | AUTOMATIC | AUTOMATIC | YES |
| 5 | (351,506) | 0 | — | 51.6 | IN USE | AUTOMATIC | LOW | YES |
| 6 | (275,861) | 0 | — | 50.2 | IN USE | AUTOMATIC | STOPPED | YES |
| 7 | *(562,128) | 300 | (570,141) | 55.6 | IN USE | MANUAL | LOW | NO |
| 8 | (265,762) | 0 | — | 55.7 | ARRIVED AT DESTINATION | STOPPED | — | NO |
| 9 | (345,678) | 0 | — | 50.3 | ALREADY ALIGHTED | STOPPED | — | YES |
| 10 | (123,445) | 0 | — | 49.9 | DEADHEADING TO WAITING AREA | AUTOMATIC | — | YES |
| 11 | (323,123) | 0 | — | 52.3 | CLEANING | STOPPED | — | YES |
| 12 | (233,225) | 0 | — | 55.5 | CHARGING | STOPPED | — | YES |

137

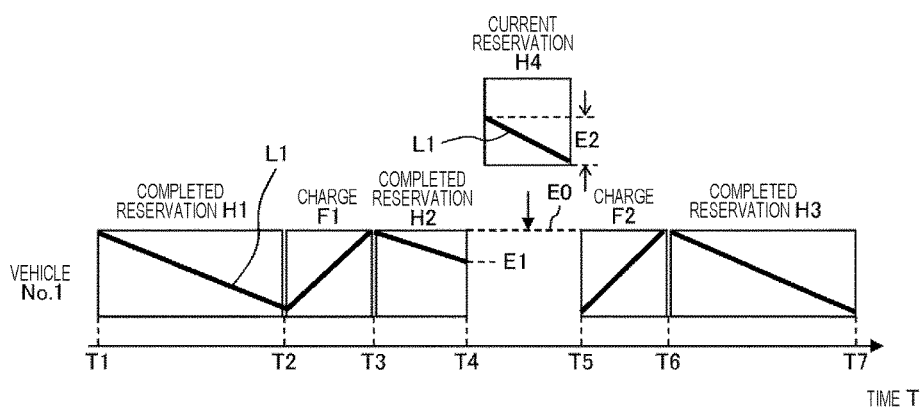

FIG. 5

USE-ASSISTING TOOL FOR AUTONOMOUS MOBILE DEVICE, OPERATION MANAGEMENT CENTER, OPERATION SYSTEM, AND AUTONOMOUS MOBILE DEVICE

TECHNICAL FIELD

The present invention relates to a use-assisting tool for an autonomous mobile device that travels autonomously along a route to a destination, an operation management center, an operation system, and an autonomous mobile device, and particularly to a use-assisting tool for an autonomous mobile device, an operation management center, an operation system, and an autonomous mobile device which provide enhanced convenience for a user.

BACKGROUND ART

Recently, an autonomous mobile device that travels autonomously along general public roads lacking any infrastructure such as travel rails or guides to a destination while estimating its location with a sensor such as GPS (Global Positioning System) or a laser scanner is being developed. Among rideable-type autonomous mobile devices, there are automobile type which travels on roads and personal mobility type which can travel on sidewalks.

Autonomous mobile devices have various advantages that do not exist in conventional automobiles. For example, automobiles can be owned by an individual or used by renting or car sharing. In contrast, an autonomous mobile device can utilize an autonomous mobile function to automatically travel to a pick-up location where usage is set to begin, and thus a user can utilize the device from an arbitrary location such as his/her home. Also, a user can alight at the doorstep of his/her destination and then the autonomous mobile device can automatically return to a parking lot or waiting area. Further, autonomous mobile devices can enhance convenience by, for example, cooperating with another autonomous mobile device such as an autonomous mobile cart at a destination site to facilitate shopping. In addition, a personal mobility device which can travel on sidewalks does not interfere with its surroundings even when traveling slowly, and thus it can be used as a replacement for walking, and can naturally enable a user to travel together with a pedestrian while chatting by raising the seat thereof so that the user's eye line is approximately the same height as that of a standing person's. Given these advantages, autonomous mobile devices are particularly suited to being used for mobility support such that elderly people with weak legs/backs can easily go outside.

As the energy source of an autonomous mobile device, electricity from rechargeable batteries is often used in consideration of environmental conservation through utilization of natural energy. Rechargeable batteries are generally of a type that takes time for charging unlike gasoline, and thus it is necessary to create a usage plan that incorporates sufficient charging beforehand so that it is not necessary to charge the batteries during use. The charge timing is determined based on the necessary energy amount according to the remaining energy, the usage duration, and the distance to be traveled, as well as the time that usage began and the like. This information must be obtained from a user in advance. As a method for obtaining this information, a user can be prompted to input/set it on a screen of an information device, but even elderly people must be able to easily perform the input/setting operation.

Further, in the case of renting or car sharing, not only must a usage plan be created so as to avoid any effects on the usage schedule of others, but it is also necessary to manage such that the usage plan can be executed as intended.

PTL 1 discloses an automobile management system in which destination information and purpose of use information are obtained from a user, an amount of energy to be consumed is calculated from the above information, and then a vehicle that can satisfy the energy consumption standards is selected.

Also, PTL 2 discloses a method in which the locations of available vehicles are displayed graphically so that a user can select a vehicle therefrom in order to enable the user to easily make a usage request.

CITATION LIST

Patent Literature

PTL 1: JP 2010-237980 A
PTL 2: JP 2010-122988 A

SUMMARY OF INVENTION

Technical Problem

In the case of PTL 1, by obtaining a large amount of information related to the user, a vehicle that is most suited to the conditions of the user, the purpose of use, the energy consumption, and the like is selected. However, no consideration is given to enabling a user to easily input the large amount of information.

As a means with which a user sets the information necessary for executing a usage plan, the use of a network terminal such as an internet-connected PC, a tablet PC, a mobile telephone, and a smartphone, which have become widespread in recent years, is convenient because information can be set from various locations. In particular, mobile telephones and smartphones are convenient because they can be started up quickly and information can be set to call an autonomous mobile device on the go. However, they suffer from a disadvantage in that their size is designed to be easy to carry, and thus the input screen is small and inputting detailed information may be difficult for elderly people whose sensation in their finger tips and motor function has weakened. Therefore, it is necessary to make it as easy as possible to input the necessary and sufficient information.

PTL 2 discloses a method in which a user can easily designate a vehicle to be used by graphically displaying the locations of available vehicles and then selecting a vehicle to be used therefrom. However, for an autonomous mobile device, it is necessary to input various information such as a boarding/alighting site, a boarding time, and the like, and a method for facilitating the input of such information is not disclosed therein.

Personal mobility devices can also be used in ways that do not exist in conventional vehicles, such as to travel slowly so as to enjoy the surrounding scenery or to stand around chatting. Conventionally, the main factor leading to the required time to reach a destination exceeding the originally anticipated required time has been road traffic. However, in the case of personal mobility devices, the above-described uses may also become contributing factors. Thus, it is necessary to be able to create a usage plan upon estimating the necessary amount of energy and required time as accurately as possible even when using the device in the ways described above.

Further, PTL 1 discloses a means of alerting a user that the vehicle is about to leave a permitted range when the vehicle approaches a certain distance to the outer periphery of the permitted range that deviates from a predetermined travel route in order to prevent running out of energy while traveling. However, when traveling on a sidewalk, the speed of travel is slow and it may not be easy to reach a charging station, and thus a method for more reliable prevention of running out of energy while traveling is needed.

In addition, a user must also be able to smoothly utilize an autonomous mobile device in order to prevent exceeding usage duration so as to avoid running out of energy during travel. One situation which may prevent smooth utilization and cause trouble is when a user must search for his/her autonomous mobile device from among multiple autonomous mobile devices that have come to pick up a user at a location such as a station rotary where many people call an autonomous mobile device.

In this case, if the location of the autonomous mobile device could be presented to the user in real time, it would be easy for the user to search for his/her autonomous mobile device by referring to the timing at which the autonomous mobile device will approach and the bearing and distance from which it will approach. However, autonomous mobile devices are capable of methods of use in which a user boards in front of his/her home and alights in front of a destination. Therefore, may be possible to infer who used the autonomous mobile device and for what use based on the location information, and thus a means for ensuring privacy when displaying the location is necessary.

Moreover, the outdoors communication environment is another factor leading to exceeding usage duration. In order to operate an autonomous mobile device, an operation management center is required to constantly monitor the current location and state of the autonomous mobile device. However, there are places in which the outdoors communication environment is poor, so a communication algorithm that does not negatively affect the operation even if the communication is interrupted is necessary. Also, in the case that an autonomous mobile device breaks down in a poor communication environment, a system in which such a break down can be quickly detected and rescue can be dispatched is needed.

In consideration of the above problems, an object of the present invention is to provide a use-assisting tool for an autonomous mobile device, an operation management center, an operation system, and an autonomous mobile device for preventing running out of energy while traveling and preventing any effects such as delays to the next user by creating a usage plan by enabling a user to input and set information with a simple operation to estimate a necessary energy and usage duration as accurately as possible as well as by preventing exceeding the usage duration.

In other words, an object of the present invention is to provide a use-assisting tool for an autonomous mobile device, an operation management center, an operation system, and an autonomous mobile device which provide enhanced convenience for a user of an autonomous mobile device through the considerations mentioned above.

Solution to Problem

Given the above, in order to solve the above-describe problems, the present invention is constituted as described below.

A use-assisting tool according to the present invention is the use-assisting tool for an autonomous mobile device that provides assistance for using an autonomous mobile device which travels autonomously along a route to a destination, the use-assisting tool including a communication means which communicates with an operation management center, an input means, and a display means, wherein a destination to be visited using the autonomous mobile device is input by the input means, and the display means displays cooperation information established at the destination that is transmitted from the operation management center.

The cooperation information that is established at the destination includes information regarding securing a mobility means at the destination and establishing a reservation at the destination.

A use-assisting tool according to the present invention includes an operation management center for an autonomous mobile device which causes the autonomous mobile device to travel to a destination designated by a user, the operation management center including a communication means which communicates with a use-assisting tool, a storage means, and a calculation means, wherein the storage means stores a destination and cooperation information at the destination, and the calculation means confirms the cooperation information stored in the storage means according to the destination provided from the use-assisting tool, establishes the cooperation information by liaison with the destination, and transmits the established cooperation information to the use-assisting tool.

An operation system for an autonomous mobile device according to the present invention includes an autonomous mobile device that controls a travel mechanism to travel to destination site coordinates, a use-assisting tool with which a user designates starting site coordinates, destination site coordinates, and a usage time, and an operation management center that causes the autonomous mobile device to travel to a destination designated by the use-assisting tool, wherein the system provides:

a communication means that periodically obtains a current location and state information from the autonomous mobile device; a route planning means that plans a route from the starting site coordinates to the destination site coordinates; an operation plan information calculation means that calculates a distance and time when traveling the route planned by the route planning means; a reservation management means that calculates an energy needed for travel based on information calculated by the operation plan information calculation means and determines the feasibility of the route based on the results thereof as well as a usage time and an estimated energy remaining in the autonomous mobile device to execute travel reservation management of the autonomous mobile device; an autonomous mobile device instruction means that provides through communication an instruction to travel the route planned by the route planning means to the autonomous mobile device; a site information database that coordinates site names and site coordinates; and a site coordinates searching means that searches for the starting site coordinates and the destination site coordinates from the site information database based on a starting site name and a destination site name designated by the user, and the reservation management means adds a leeway time designated by the user to information that serves as the basis for determining the feasibility of travel.

Thereby, a user can designate site coordinates of a starting site/destination site with just a simple and easy-to-understand operation of selecting a site name, and not only can an energy needed for travel be calculated based thereon, but a leeway time can also be designated in accordance with uses such as traveling slowly to enjoy the surrounding scenery or standing around chatting. Therefore, a more accurate energy needed for travel and usage duration can be estimated. As a result, travel reservation management can be conducted in consideration of charge timing.

The site information database includes data related to a cooperation device and cooperation information for each site and data describing an association between the cooperation device or cooperation information and the usage time of the autonomous mobile device. In the case that at least either one of a cooperation device or cooperation information exists at the destination designated by the user, if the cooperation device or cooperation information affects the usage time of the autonomous mobile device, the reservation management means makes a reservation for use of the cooperation device or the cooperation information and determines the usage time of the autonomous mobile device based on the results thereof. Meanwhile, if the cooperation device or cooperation information is affected by the usage time of the autonomous mobile device, the reservation management means makes a reservation for use of the cooperation device or the cooperation information based on the usage time of the autonomous mobile device.

Thereby, the user can easily input a usage time in accordance with the object to be used in cooperation with the autonomous mobile device. Also, the user can make a reservation for the object to be used in cooperation with the autonomous mobile device in accordance with the usage time of the autonomous mobile device. Therefore, the user can use the autonomous mobile device and the cooperation device smoothly in cooperation with each other, and thus the use thereof is more convenient. Also, the time for cooperation can be kept within a fixed time period due to the smooth execution of the cooperation, and thus more accurate usage duration can be estimated. As a result thereof, exceeding the usage duration can be prevented.

Also, in the autonomous mobile device operation system, a manual travel means with which the user can modify the speed, temporarily stop the autonomous travel, restart the autonomous travel, travel manually, and switch between manual travel and autonomous travel is provided in the autonomous mobile device. State information that is periodically obtained from the autonomous mobile device includes a traveling state and speed information. The autonomous mobile device instruction means calculates an estimated time of arrival at the destination site coordinates from the current location of the autonomous mobile device and the destination site coordinates, and presents an overtime prevention measure to the user if the difference between the calculated estimated time of arrival at the destination site coordinates and the original estimated time of arrival at the destination site coordinates is within a certain time or if the estimated time of arrival at the destination site coordinates is later than the original estimated time of arrival at the destination site coordinates. The method for presenting an overtime prevention measure is to urge a speed increase if the speed has been lowered or urge a restart of travel if the autonomous mobile device has stopped, and to notify the user if a subsequent reservation has been booked.

Thereby, if the user is traveling slowly so as to enjoy the surrounding scenery or standing around chatting during usage of the autonomous mobile device and thus is about to exceed the original estimated time of arrival at the destination site coordinates, an operation that should be conducted in order to prevent exceeding the time is specifically instructed. Thus, the user can easily understand the operation that should be conducted and easily follow the instruction, and thus the possibility that exceeding the time can be prevented increases.

A current location indication means is also provided to indicate to the user the current location of the autonomous mobile device during travel toward the starting site. The current location indication means displays a detailed location if any one or more of the following preset conditions is satisfied: the autonomous mobile device travels a set distance or more away from an alighting site of a previous user, or the autonomous mobile device enters within a set distance from the starting site, or a set time or more has passed from an alighting time of a previous user, or the autonomous mobile device reaches a preset road. If none of the above conditions are satisfied, the current location indication means displays a rough location.

Thereby, in the case that multiple autonomous mobile devices have come to pick up users at a location such as a station rotary where many people call an autonomous mobile device, the user can confirm the progression of the current location of his/her autonomous mobile device. Thus, the user can easily search for his/her autonomous mobile device so that he/she can smoothly find and board his/her autonomous mobile device in a short amount of time, and this can contribute to preventing exceeding the usage duration. Also, in the current location display of the autonomous mobile device, the alighting site of the previous user is not clearly displayed, and thus any leaks of private information such as the location of the home or the location of the destination site which is the site at which the previous user alighted can be prevented. In other words, the privacy of the previous user can be ensured while also enhancing the convenience for the current user so that the current user can board smoothly, and thereby exceeding the usage duration can be prevented.

The autonomous mobile device instruction means transmits a command corresponding to a state obtained from the autonomous mobile device, and retransmits the command periodically until the state obtained from the autonomous mobile device switches to a state that should be reached after the command.

Thereby, communication can be kept to only periodic communication and the amount of communication per transmission can be kept within a fixed amount. Thus, since the amount of communication is reduced compared to a communication method in which a command is transmitted to the autonomous mobile device and then frequently retransmitted until a communication notifying that the command has been received is received from the autonomous mobile device, increases in communication traffic in an outdoors environment in which the communication environment is unstable can be prevented. In turn, stops of the autonomous mobile device due to the occurrence of abnormalities caused by communication failures from traffic increases can be prevented, and thereby exceeding the usage duration can be prevented.

In the case that the current location and state information cannot be periodically obtained from the autonomous mobile device, the autonomous mobile device instruction means predictively calculates and stores the current location on the route from a planned traveling speed of the autonomous mobile device. If the duration of time during which the current location and state information cannot be periodically obtained from the autonomous mobile device reaches or exceeds a certain continuous duration of time, the autonomous mobile device instruction means instructs the autonomous mobile device confirmation means to search the surroundings from a current location that was last obtained to a current location that was most recently predicted.

Thereby, when communication from the autonomous mobile device has been interrupted for a long time at a place at which communication is anticipated to be secured, the autonomous mobile device can be searched for by the autonomous mobile device confirmation means, such as by dispatching a staff member to go out in an automobile focusing on places at which the autonomous mobile device may be, confirming street live-feed cameras, and the like. Thus, the autonomous mobile device can be found as quickly as possible, its state can be confirmed, and it can be repaired in the case that an abnormality has occurred. If the user has purposely stopped the autonomous mobile device, the user can be urged to restart traveling toward the destination, and thereby exceeding the usage duration can be prevented.

In the autonomous mobile device which includes a means with which the user designates starting site coordinates, destination site coordinates, and a usage time, a route planning means that plans a route from the starting site coordinates to the destination site coordinates, an operation plan information calculation means that calculates a distance and time when traveling along the route planned by the route planning means, and a reservation management means that calculates an energy needed for travel based on the information calculated by the operation plan information calculation means and determines the feasibility of travel based on the calculated energy needed for travel as well as the usage time and the estimated energy remaining in the autonomous mobile device to execute travel reservation management of the autonomous mobile device, the following are provided: an information input means with which the user designates the site names of the starting site and the destination site and designates a leeway time, a site information database that coordinates the site names and the site coordinates, and a site coordinates searching means that searches for the starting site coordinates and the destination site coordinates from the site information database based on the starting site name and the destination site name designated by the user. Therein, the leeway time designated by the user is added to the information which the reservation management means uses to determine the feasibility of travel.

Thereby, even in the case that the autonomous mobile device is owned by an individual instead of used for renting or car sharing, the site coordinates of the starting site/destination site can be designated with an easy-to-understand operation of selecting the site names and the leeway time can be designated in a single autonomous mobile device. Thus, a more accurate energy needed for travel and usage duration can be estimated. Accordingly, charging can be carried out before use if necessary, and thus the inability to travel due to running out of energy during use can be prevented.

Advantageous Effects of Invention

As described above, exceeding the usage duration can be prevented with a more accurate usage plan and measures against exceeding the usage duration, and thus a situation in which a user becomes unable to travel due to running out of energy during use, which causes considerable trouble for the user, can be prevented. Also, in the case of a rental or car sharing system, a situation in which the next user is inconvenienced due to a delay in the usage start time can be prevented.

Further, convenience for the user of an autonomous mobile device can be enhanced through the considerations mentioned above.

BRIEF DESCRIPTION OF DRAWINGS

FIG. 2 illustrates an example of data stored in a site information database within an operation management center.

FIG. 3 illustrates an example of data stored in a vehicle information database within the operation management center.

FIG. 4 illustrates an example of current information stored in a current information storage means within the operation management center.

FIG. 5 is an image diagram illustrating a method by which a reservation management means within the operation management center creates a usage plan.

DESCRIPTION OF EMBODIMENTS

An embodiment of the present invention is hereinafter described with reference to the drawings.

In the present embodiment, an example of an operation system of an autonomous mobile device that autonomously travels to a destination along a route will be explained.

Figure 1:
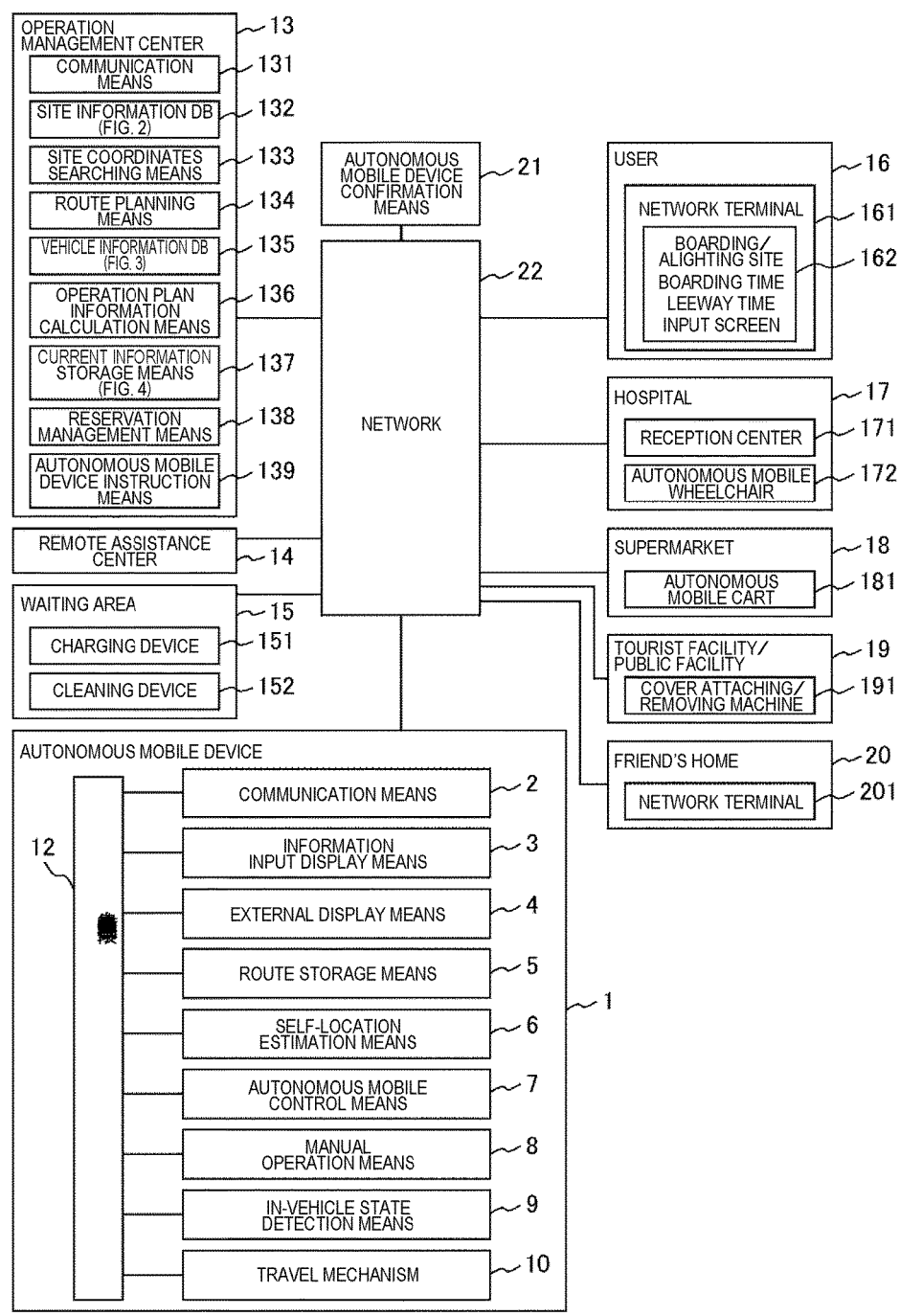
FIG. 1 illustrates a constitutional example of an autonomous mobile device operation system according to an embodiment of the present invention.

FIG. 1 illustrates a constitutional example of the autonomous mobile device operation system according to the present embodiment. The autonomous mobile device operation system is constituted such that multiple facilities and equipment are linked over a network 22.

The detailed constitutions and detailed functions of the operation system will now be successively explained. A user 16 of the system makes a usage reservation of an autonomous mobile device 1 via the network 22, and visits to and returns from various facilities (a hospital 17, a supermarket 18, a tourist facility/public facility 19, a friend's home 20) by being picked up/dropped off by the autonomous mobile device 1. Reservation and pick-up/drop-off of the autonomous mobile device 1 is executed through assistance from an operation management center 13, a remote assistance center 14, and an autonomous mobile device confirmation means 21. Various assistance equipment (an autonomous mobile wheelchair 172, an autonomous mobile cart 181, a cover attaching/removing machine 191, etc.) is installed at the places to be visited of various locations within the city. Further, a waiting area 15 of the autonomous mobile device 1 is also prepared.

Hereinafter, the equipment/facilities described in FIG. 1 will be successively explained. First, the autonomous mobile device 1, such as an autonomous mobile automobile or an autonomous mobile personal mobility device, includes the following means.

2 denotes a communication means such as a wireless LAN. The autonomous mobile device 1 is connected to the network 22 via the communication means 2, and the communication means 2 periodically transmits the current location and state of the autonomous mobile device 1 to the operation management center 13 to be explained below, and receives travel instructions and the like from the operation management center 13.

3 denotes an information input display means such as a touch panel display. 4 denotes an external display means for presenting information toward the outside of the autonomous mobile device 1, and is realized by, for example, providing an LED display on the body surface.

5 denotes a route storage means that stores a route to be autonomously traveled by the autonomous mobile device 1. 6 denotes a self-location estimation means that estimates that current location of the autonomous mobile device 1 by matching a surrounding shape with a surrounding shape map using GPS or a laser scanner.

7 denotes an autonomous mobile control means that finds a direction and speed that should be traveled by the autonomous mobile device 1 based on route coordinates stored by the route storage means 5 and a current self-location estimated by the self-location estimation means 6. 8 denotes a manual operation means such as a steering wheel or a joystick for allowing a user of the autonomous mobile device 1 to manually make the autonomous mobile device 1 travel by instructing a progression direction and speed of the autonomous mobile device 1.

9 denotes an in-vehicle state detection means consisting of a camera, an image processing device, and the like. Herein, the in-vehicle state detection means 9 monitors the state of the user who is using the autonomous mobile device 1, and detects forgotten objects after the user alights from the autonomous mobile device 1 and also detects the level of dirtiness of the autonomous mobile device 1. Monitoring the state of the user also includes a biological information monitoring device for detecting any abnormalities in a user who is going to the hospital.

10 denotes a travel mechanism consisting of wheels, a motor, a control device, and the like. In the travel mechanism 10, the control device controls the motor based on the progression direction and speed information output from the autonomous mobile control means 7 and the manual operation means 8 to move the wheels for travel.

12 denotes a control means of the autonomous mobile device 1 that controls the above-described means within the autonomous mobile device 1.

In contrast, the operation management center 13 that is connected to the autonomous mobile device 1 via the network 22 is constituted as described below. The operation management center 13 is for obtaining information regarding the usage of the autonomous mobile device 1 from the user 16 and providing a travel command to the autonomous mobile device 1 based on the obtained information.

First, 131 denotes a communication means such as a wireless LAN which periodically obtains a current location and state information from the autonomous mobile device 1.

132 denotes a site information database that stores information regarding sites. Examples of information stored therein are shown in FIG. 2. The site information database 132 stores the following: a site name 300, site coordinates 301, data 302 regarding devices and information with which the autonomous mobile device 1 is intended to cooperate at the site, time information 303 that is intended to be mutually reflected between the autonomous mobile device 1 and the cooperation device, cooperation information, and the like.

Among the above, the site name 300 is a name of a place that is often used and can be easily understood by the user, and therein a station name, a hospital name, and a supermarket name are described. The site coordinates 301 are the location coordinates of a place near the site name at which the autonomous mobile device 1 is intended to stop. The specific boarding/alighting site can be at the front door in the case of a house or building, or the coordinates of a rotary in front of a station in the case of a station. The site coordinates 301 can be described and stored with GPS information or the like.

The data 302 regarding devices and information to be cooperated with stores a mobile equipment or information thereof for when the user who has arrived at the station, hospital, or supermarket using the autonomous mobile device 1 will switch to another mobile equipment to be used within the facility.

For example, at Tokyo Hospital, which is Example No. 3 in FIG. 2, a user may switch to an autonomous mobile wheelchair that can travel within a narrow building. Thus, the autonomous mobile wheelchair is stored as a cooperation device. Also, a reservation is necessary to use the autonomous mobile wheelchair, and an examination appointment is necessary as a perquisite thereof. The reservation for the autonomous mobile wheelchair and the examination appointment are stored as cooperation information.

As other cooperation devices, for example, Example No. 4 is an autonomous mobile cart that the user can hold onto to use for walking assistance at a ○ Supermarket, and Example No. 5 is a cover attaching/removing machine that removes a hood cover of an autonomous mobile personal mobility device and converts it to a constitution of a seating surface and travel mechanism which can travel within the facility building in a Δ Museum. As other cooperation information, with regard to use at the station of Example No. 1, mention may be made of a departure time of a train at the station when the user alights and arrival time of a train at the station when the user is picked up.

In Example No. 1, for example, in the case that the autonomous mobile device 1 is used to go to the station in order to ride a train, the time reflection information 303 lists a departure time of a train to be reflected on a time at which the autonomous mobile device 1 should arrive at the station. By back calculating from there, a time at which the autonomous mobile device 1 should depart from the boarding site can be found, and this becomes the boarding time of the autonomous mobile device 1. Similarly, in the other examples, the time reflection information 303 is prepared and stored in consideration of the time needed for switching between the autonomous mobile device 1 and another cooperation device.

Returning to FIG. 1, 133 denotes a site coordinates searching means that searches for the site coordinates 301 from the site name 300 using the site information database 132 of FIG. 2.

134 denotes a route planning means that plans a route from a boarding site to an alighting site using a road map (not illustrated).

135 denotes a vehicle information database that stores information related to a vehicle of each autonomous mobile device 1. Examples of information stored therein are shown in FIG. 3. Herein, the energy consumed is divided into states (during low speed, during high speed, and when stopped) of the autonomous mobile device 1 and stored for each individual vehicle of the autonomous mobile device 1. In FIG. 3, 400 denotes the vehicle No., and tied thereto are 401, 402, and 403 which respectively indicate the energy consumption characteristics during low speed, during high speed, and when stopped as numerical values.

136 denotes an operation plan information calculation means that calculates a distance and duration when traveling the route planned by the route planning means 134.

137 denotes a current information storage means that stores a current location, a current state, and the like of the autonomous mobile device 1 obtained via the communication means 131. Examples of information stored therein are shown in FIG. 4. In FIG. 4, the vehicle No. 400 tied thereto are a current location (predicted) 501 of each autonomous mobile device 1, a communication interruption time 502 in the case that periodically received information cannot be continuously obtained, an interruption start location 503, remaining energy 504, a state 505 such as waiting or in use, a travel mode 506 such as stopped, automatic, or manual, a speed setting 607 during travel, and information 508 about the existence of a subsequent reservation.

138 denotes a reservation management means that calculates an energy needed for travel based on information calculated by the operation plan information calculation means 136 and information such as the usage duration designated separately by the user, and determines the feasibility of the route based on the results thereof as well as a usage time and remaining energy information (FIG. 3) of the current information vehicle information database 135 to execute travel reservation management of the autonomous mobile device 1.

FIG. 5 is an image diagram illustrating a method by which the reservation management means 138 creates a usage plan. Completed usage reservation time slots and charging time slots relative to a time axis T of each autonomous mobile device 1 are notated. In this example, the autonomous mobile device 1 whose vehicle number is No. 1 has already booked completed reservations (reservations H1, H2, and H3) between times T1 and T2, between times T3 and T4, and between times T6 and T7, and has scheduled charging times between these usage reservation periods so as to prepare for the next usage. The charging times are between times T2 and T3 and between times T5 and T6 (charges F1 and F2). In this sequence of usage and charging plans, there is no reservation plan between times T4 and T5, so herein consider a case in which a current reservation H4 is to be inserted into this time slot.

In the creation of a usage plan in the reservation management means 138, the remaining energy at the end time of each time slot is managed. In FIG. 5, the thick line L1 represents remaining energy, and this information is calculated and stored. In the example illustrated in FIG. 5, a remaining energy E1 at a usage start time (T4) of the current reservation H4 cannot begin from a full charge E0. The current reservation H4 will continue the use (T3 to T4) without stopping from the previous completed reservation H2, and thus the usage reservation is made on the premise that the usage duration and usage content are limited.

For example, when a reservation request H4 is newly received, the remaining energy E1 at the start time T4 of the time slot of the reservation to be newly added is compared with a travel energy E2 required for the reservation to be newly added. If the former is greater, then the reservation can be made, but if the former is not greater, then the reservation will be determined to be impossible. In the case that the reservation is impossible, the user must modify the usage settings. Further, a charging plan is also incorporated to charge at times when the remaining energy is low. Modifying the usage settings includes modifying the vehicle to be used or modifying the content of usage and the like.

139 denotes an autonomous mobile device instruction means that provides an instruction command via wireless communication to each autonomous mobile device 1. Thereby, route information such as information regarding boarding/alighting sites and stopover points as well as usage information consisting of a boarding time and the like are transmitted to the autonomous mobile device 1. Also, the autonomous mobile device 1 transmits a travel command so that it will depart at a time found by subtracting the amount of time required to go from the current location to the boarding site from the boarding time.

In a place with a narrow road that does not allow two vehicles to pass each other, the autonomous mobile device instruction means 139 monitors the current location of each vehicle in the current information storage means 137 and provides a command such as wait-to-pass or priority passage to each autonomous mobile device 1 so that they can pass each other at a wider place before entering the narrow road.

When transmitting a command to the autonomous mobile device 1, the autonomous mobile device instruction means 139 transmits a necessary command in accordance with the vehicle state stored by the current information storage means 137. The autonomous mobile devices 1 do not respond with a signal indicating receipt of the command even when they have received the command. Instead, the autonomous mobile device instruction means 139 periodically retransmits the command until the vehicle state enters a state in which it should be after the command. Thereby, missed commands can be prevented without any abnormal increases in communication traffic in environments in which the communication conditions are poor, and thus the occurrence of abnormalities in the autonomous mobile device 1 due to communication traffic increases or missed commands can be prevented.

The remote assistance center 14 assists users remotely when the in-vehicle state detection means 9 within the autonomous mobile device 1 detects an in-vehicle abnormality or the like. For example, the remote assistance center 14 monitors the biological information of a user who is traveling to the hospital, and speaks to the user via the information input display means 3 if an abnormality arises.

Also, an estimated required time from the current location to the alighting site is calculated by comparing the current location stored in the current information storage means 137 with the usage plan created by the reservation management means 137. If the estimated time of arrival at the alighting site approaches within a fixed time to the original estimated time of arrival or the estimated time of arrival at the alighting site exceeds the original estimated time of arrival, the remote assistance center 14 presents the user with an alert that he/she is about to exceed the usage duration via the information input display means 3 of the autonomous mobile device 1.

The method of presenting mentioned above consists of checking the travel mode, speed setting, and existence of a subsequent reservation of a vehicle whose state stored in the current information storage means 137 is in-use, and then urging the user to raise the speed when the speed is lower than an automatic setting. If stopped, the user will be urged to restart the travel. If a subsequent reservation has been booked, this information will be presented. The remote assistance center 14 presents the user with a specific method for preventing overtime of the usage duration, and this is easy to understand and easy to follow for the user, and thus the possibility that exceeding the time can be prevented increases.

Waiting areas 15 are prepared at locations within the city as places where the autonomous mobile devices 1 wait. If necessary, the waiting areas 15 can include a charging device 151 for charging the energy and a cleaning device 152 for cleaning the inside of the vehicle.

Unlike conventional automobile rental and car sharing systems, the autonomous mobile device 1 can pick up a user by autonomously traveling to a desired boarding site. Therein, if the autonomous mobile device 1 stops for a long period at the boarding site, this may interfere with passing traffic. Thus, in addition to a large waiting area for storing autonomous mobile devices 1 that are not in use, small waiting areas are provided throughout the city so that the autonomous mobile device 1 can arrive to the boarding site at the boarding time set by the user. The autonomous mobile device instruction means 139 can control the dispatch of vehicles so that an autonomous mobile device 1 heads out early to the vicinity of the boarding site of the next user, waits at a nearby small waiting area, and then departs from there to the boarding site when the boarding time approaches.

The user 16 of the autonomous mobile device 1 conducts the following process to reserve the autonomous mobile device 1.

161 denotes a network terminal such as an internet-connected PC, a tablet PC, a mobile telephone, or a smartphone with which the user sets the usage information of the autonomous mobile device 1. In particular, mobile telephones and smartphones are convenient because they can be started up quickly and information can be set to call an autonomous mobile device on the go. Although not illustrated, a reservation center capable of handling reservation requests by telephone or mail can be provided for users who find it difficult to operate information equipment.

The network terminal is a use-assisting tool for the autonomous mobile device that assists a user in using the autonomous mobile device, and includes a communication means for communicating with the operation management center, an input means, and a display means.

162 denotes a usage information settings screen of the network terminal 161. Thereon, information related to the boarding/alighting sites and information related to the usage duration such as the boarding time and the leeway time are set. Specific screen examples will be explained later. Any method can be used to realize the usage information settings screen 162, such as a specialized application installed in the network terminal 161 or a web screen provided by the operation management center 13.

Next, the facilities/equipment that should be provided at the places to be visited by the user 16 will now be explained. Among the places to be visited by the user 16, one place that is likely to be visited frequently is the hospital 17.

If the destination to be visited by using the autonomous mobile device 1 is a hospital, the following matters should be considered in order to enhance the convenience for the user 16. If the user makes an appointment at the hospital and travels so as to arrive at the hospital at the time of the appointment, the waiting time at the hospital will be reduced and this is convenient for the user 16. Thus, the autonomous mobile device operation system should cooperate with an appointment center 171 of the hospital.

When setting the usage information of the autonomous mobile device 1, the existence of an examination appointment request at the hospital can also be set, and if an examination appointment request exists, the reservation management means 138 within the operation management center 13 transmits an examination appointment request procedure to the reception center 171 of the hospital 17. The reception center 171 of the hospital 17 receives the examination appointment, and transmits an examination appointment time to the reservation management means 138. The reservation management means 138 subtracts a travel time from the boarding site to the hospital from the examination appointment time to determine a boarding time. This boarding time is transmitted to the usage information settings screen 162 and presented to the user, and the user sets the boarding time upon referring to the presented time.

Also, a user 16 who will travel to the hospital may include people who face difficulty in moving within the hospital. An autonomous mobile wheelchair 172 is provided within the hospital for such people. It is convenient for the user to be able to switch from the autonomous mobile device 1, which is for travel outdoors, to the autonomous mobile wheelchair 172. Therefore, when the user sets the usage information on the usage information settings screen 162, the reservation management means 138 transmits a wheelchair reservation setting to an operation management center of the autonomous mobile wheelchair 172 within the hospital and the operation management center of the autonomous mobile wheelchair 172 receives the wheelchair reservation so that the autonomous mobile wheelchair 172 travels autonomously and arrives at the switching site at the alighting time of the autonomous mobile device 1. A suitable switching site is, for example, in front of the hospital.

Another example of a destination of travel by using the autonomous mobile device 1 is a supermarket 18. At the supermarket 18, if there are carts at the alighting spot of the autonomous mobile device 1, it is convenient because a user with weak legs/back can grab onto a cart and support his/her body for walking after alighting from the autonomous mobile device 1.

Thus, an autonomous mobile cart 181 is provided at the supermarket 18. When the user sets the usage information on the usage information settings screen 162, the reservation management means 138 transmits a cart reservation setting to an operation management center of the autonomous mobile cart 181 within the supermarket and the operation management center of the autonomous mobile cart 181 receives the cart reservation so that the autonomous mobile cart 181 travels autonomously and arrives at the switching site at the alighting time of the autonomous mobile device 1.

If a tourist facility/public facility 19 is the destination to be traveled to using the autonomous mobile device 1, the passages within the building are often wide. In such a usage situation, in the case of a personal mobility-type autonomous mobile device 1, if the seat thereof is raised so that the user's eye line is approximately the same height as that of a standing person's, the user can communicate more naturally similar to those standing around him/her. In a museum or the like, the pieces on exhibit are often displayed at positions which are easy to see from the eye line of a standing person. Thus, if the user can sit so that his/her eye line is approximately the same height as that of a standing person's, the user will be able to easily view the exhibited piece.

Also, in tourist facilities or public facilities such as a museum or a municipal office building, there are many places with wide passages. Therein, the personal mobility-type autonomous mobile device 1 can be designed so that a roof cover can be attached thereto and removed therefrom, and a cover attaching/removing machine 201 which can automatically attach/remove the cover can be provided. When the user sets the usage information on the usage information settings screen 162, a destination stopover point is set as the cover attaching/removing machine 191, and the reservation management means 138 transmits a reservation setting for use of the cover attaching/removing machine 191 to a management device of the cover attaching/removing machine 191 and the management device of the cover attaching/removing machine 191 receives the reservation for use so that the cover attaching/removing machine 191 can be used at the time of arrival at the cover attaching/removing machine 191. The user passes through the cover attaching/removing machine 191 while riding in the autonomous mobile device 1, and thereby the cover is automatically removed so the autonomous mobile device 1 can be used as an indoor personal mobility device in a coverless state and the user can enter the tourist facility/public facility 19 without alighting.

If a friend's home 20 is the destination to be traveled to using the autonomous mobile device 1, it is generally understood that the friend will also own a network terminal 201. In such a case, a method with which the user can easily set the friend's home as an alighting site on the usage information settings screen 162 will be explained below.

As described above, by preparing facilities/equipment at various locations within the city, the user's range of activity for using the autonomous mobile device 1 can be broadened, and an autonomous mobile device operation system can be created in consideration of convenience.

Furthermore, an observation framework for determining whether there are any abnormalities in the autonomous mobile device 1 is also constructed. The autonomous mobile device confirmation means 21 is a facility for confirming the state of the autonomous mobile device 1 when an abnormality has occurred in the autonomous mobile device 1 in an outdoors area with poor communication conditions. Specifically, the autonomous mobile device confirmation means 21 consists of automobiles driven by staff, and street network cameras and their operators.

In the case in which periodic current location and state information cannot be obtained from the autonomous mobile device 1, the autonomous mobile device instruction means 139 predictively calculates the current location of the autonomous mobile device 1 on the route from the planned traveling speed and records this as the estimated current location in the current information storage means 137.

If the communication interruption time stored in the current information storage means 137 exceeds a predetermined fixed time, the autonomous mobile device instruction means 139 transmits an instruction to the autonomous mobile device confirmation means 21 to search for the autonomous mobile device 1 in the vicinity of a zone from the location at which the communication interruption began to the estimated current location in the current information storage means 137.

If a person who is involved with the autonomous mobile device confirmation means 21 searches a designated area and finds the autonomous mobile device 1, the person confirms whether there are any abnormalities in the autonomous mobile device 1 and eliminates the abnormalities if any are confirmed.

The communication and instructions for the reservation settings and data described above are realized through mutual communication via the network 22. The communication means other than those of the autonomous mobile device and the operation management center are omitted from FIG. 1.

In FIG. 1, an operation system in which the autonomous mobile device 1 is used in car rental or car sharing is explained, but the various means described in the operation management center 13 can also be provided to the autonomous mobile device 1 so that the autonomous mobile device 1 can be used as single unit.

Next, specific screen examples of the usage information settings screen 162 will be explained referring to FIGS. 6 and 7. Herein, FIGS. 6 and 7 illustrate specific screen examples that are displayed on the usage information settings screen 162 according to the characteristics of each place to be visited when making a reservation to visit places using the autonomous mobile device 1.

Figure 6:
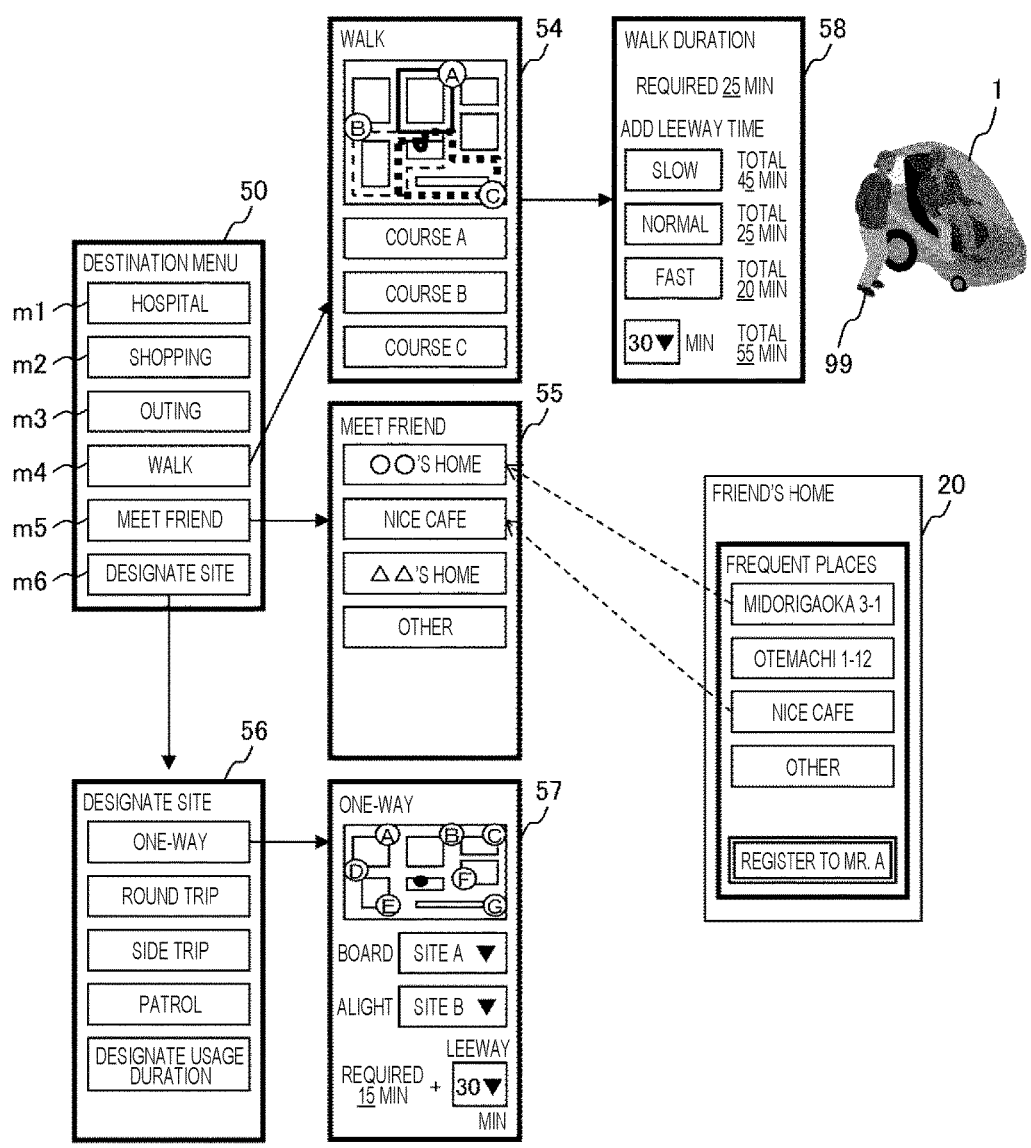
FIG. 6 is a view explaining a specific screen example of a usage information settings screen 162.
Figure 7:
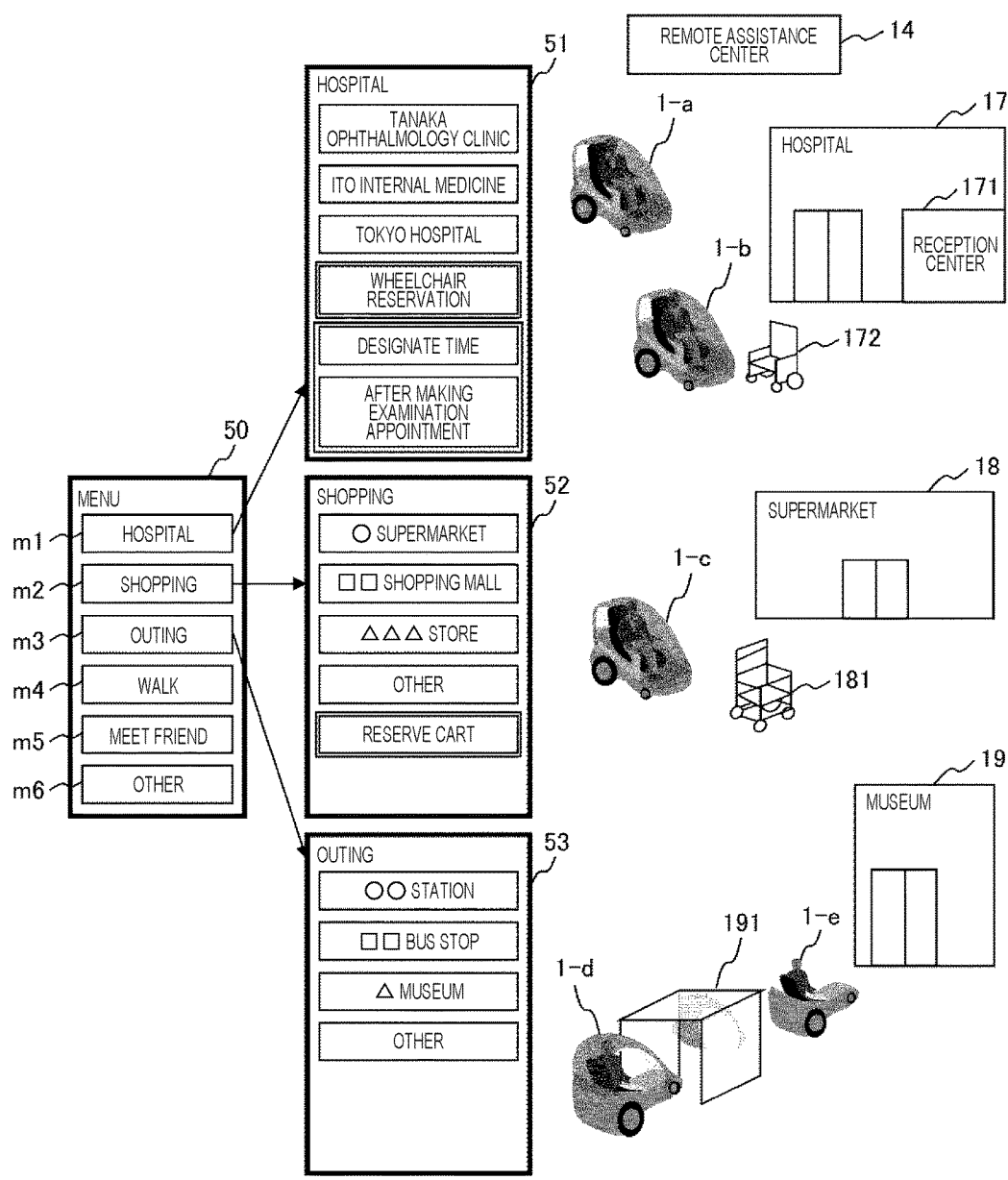
FIG. 7 is a view explaining a specific screen example of the usage information settings screen 162.

First, a screen 50 in FIG. 6 is an example of a destination menu screen that is displayed first. This screen displays destinations separated by type, and, for example, the following are displayed on the menu as the main places to be visited: a hospital m1, shopping m2, an outing m3, a walk m4, a friend's home m5, and another specific site designation m6. FIG. 6 illustrates screen transitions when the walk m4, the friend's home m5, and another specific site designation m6 are selected from among the above-described menu items. FIG. 7 illustrates screen transitions when the hospital m1, shopping m2, and the outing m3 are selected from among the above-described menu items.

For example, the screen transitions to a screen 54 when "walk m4" is selected. The screen 54 displays a simple map with walking courses (courses A, B, and C), and the user selects a walking course from among these options. For each course name, corresponding boarding/alighting site names and stopover point names are displayed on the map. This correspondence can be registered by selecting a site on the map.

When a walking course is selected on the screen 54, site information of sites along the course is transmitted to the operation management center 13, and a required time is calculated in the operation plan information calculation means 136. The required time information is transmitted back to the user's network terminal 161 as calculation results, and the required time information is presented on a screen 58 of the following hierarchy for selecting leeway time.

Herein, with regard to the leeway time, the user can directly set a value for this time, but a desired travel speed can also be selected so that a leeway time relative to a standard time can be estimated from the travel speed. In the illustrated example, the desired travel speed can be selected from "slow, normal, fast".

The user can also modify the maximum speed settings during autonomous travel or switch to manual to travel at an arbitrary speed using the manual operation means 8. Since various modes of use are possible such as standing to chat or walking slowly together with a passerby 99 around the autonomous mobile device 1, the user can also select a rough speed on the screen 58 upon envisioning a usage scene.

Once the user has completed the settings of the walking course, the leeway time, and a boarding time (not illustrated), this data is transmitted to the operation management center 13 so that the reservation management means 138 can make and manage any reservations.

Next, if "meet with a friend m5" is selected on the menu screen 50, the screen transitions to a screen 55 showing options for alighting sites. The alighting sites related to friends will differ for each user, and these sites may include a person's home or meeting outside. A method for easily setting the option in accordance with the user in this case will now be explained. Herein, it is understood that a friend 20 also has a network terminal 201.

If the network address of the user's network terminal 161 is already registered in the network terminal 201 of the friend's home, the site at which the network terminal 201 exists is periodically detected using the GPS location measurement function of the network terminal 201. An application which provides as options sites at which the network terminal 201 exists with high frequency is installed in the network terminal 201 of the friend's home. The friend then selects a site which he/she believes that the user of the autonomous mobile device 1 wants to register as an alighting site option from the options that have been provided, and displays a registration intention with a registration button or the like. Subsequently, the coordinates and site name of this site are transmitted to user's network terminal 161.

The user's network terminal 161 receives the above, and adds it to the options of the screen 55 in FIG. 6. A means is provided with which the user can freely edit the site name. Thereby, the user of the autonomous mobile device 1 can select the alighting site as an alighting site name option without the trouble of searching for the accurate alighting site coordinates. A screen 20 is a confirmation/registration screen displaying information related to the friend's home, and it is used to display places where the friend is frequently located and further register such places.

Further, if "site designation m6" is selected on the screen 50 of FIG. 6, the screen transitions to a screen 56 on which a route can be set in more detail. First, the following are selected: one-way or round trip; whether to make a side trip to a designated site before going to the destination; whether to travel through a designated stopover point and then return to the first boarding site; and whether to set the usage by a boarding site and usage duration without designating a destination.

For example, if "one-way" is selected, the screen transitions to a screen 57 on which a boarding site, an alighting site, and a leeway time are selected. The sites are selected from a site list. The list is displayed when the inverse triangle shape on the screen 57 is touched. A hospital, station, and the like which are generally used as boarding/alighting sites are registered on the list in advance, and sites used by each user can be registered to the list by selecting the site from a map on a screen (not illustrated).

The user can also arbitrarily edit the names of the registered sites with a means (not illustrated). Once a boarding site and an alighting site are selected, the selected site names are transmitted to the operation management center 13, the site coordinates searching means 133 searches for the site coordinates from the site names, the route planning means 134 plans a route, and the operation plan information calculation means 136 calculates the required distance and time. The planned route and required time are transmitted to the user's network terminal 161 and presented to the user, and the user confirms whether the route is in line with his/her desired route. The user then arbitrarily sets the leeway time according to whether he/she will travel slowly, whether he/she will travel by manual operation to make a few side trips, and the like. The boarding/alighting site names and the leeway time that have been set are transmitted to the operation management center so that the reservation management means 138 can make and manage any reservations using the above information.

The screen transitions upon selecting the hospital m1, shopping m2, and the outing m3 will now be explained referring to FIG. 7.

If "hospital m1" is selected on the screen 50 of FIG. 7, the screen transitions to a hospital selection screen 51. The user first selects a hospital where he/she has a current appointment from among the hospitals displayed in advance on the hospital selection screen 51. The user then selects to designate a boarding time, or to designate a boarding time so as to arrive at the time of the examination appointment after making an examination appointment. If the user selects to designate after making an appointment, the reservation management means 138 makes an examination appointment as described above, and then transmits the examination appointment time to the network terminal 161. Then the required time and the leeway time set by the user are subtracted from the examination appointment time, and the resulting time is presented to the user as the boarding time. The user confirms the boarding time presented on a screen (not illustrated), modifies it as necessary, and thereby sets the boarding time.

In particular, in the case of a user whose main outing is to the hospital, dispatch of a vehicle (1-*a*) equipped with biological information and in-vehicle monitors can be requested as desired. Therein, the monitors are monitored at the remote assistance center 14 during travel toward the destination. If an abnormality occurs, the remote assistance center 14 speaks to the user via the information input display means 3 and a response such as calling an ambulance can be enacted.

Also, a degree of urgency for going to the hospital can be input from the hospital selection screen 51 or the like, and the reservation management means 138 can dispatch the autonomous mobile device 1 with priority according to the degree of urgency. Further, when passing through a narrow road, the autonomous mobile device instruction means 139 can provide an instruction to the vehicles so that the autonomous mobile device 1 receives priority for passage over another autonomous mobile device 1. In addition, a vehicle equipped with a mechanism to suppress oscillations of the vehicle body and maintain the vehicle in a horizontal state can be dispatched according to the user's desire.

On the screen 51, if a wheelchair reservation at the hospital is also designated, the reservation management means 138 makes a reservation for an autonomous mobile wheelchair as described above, and the user travels to the front of the hospital in the autonomous mobile device (1-*b*) and switches there to the autonomous mobile wheelchair 172. Thus, the user can go to the reception window and examination room on the autonomous mobile wheelchair without the need to walk. Also, if a usage reservation for the autonomous mobile device 1 is also made for a return trip, the user can travel on the autonomous mobile wheelchair up to the front of the hospital and then switch there to the autonomous mobile device (1-*b*) for the return trip as well.

On the screen 50, if "shopping m2" is selected, the screen transitions to a screen 52 for selecting a store. The autonomous mobile cart 181 can also be reserved as necessary as described above. The user can travel to the store front in the autonomous mobile device (1-*c*), alight there, and then grab onto the autonomous mobile cart 181 that is waiting there to walk into the store for shopping.

On the screen 50, if "outing m3" is selected, the screen transitions to a screen 53 for selecting a place to go. Options such as a station, a bus stop, a tourist facility, and the like are presented. With regard to a facility equipped with the cover attaching/removing machine 191 into which an autonomous mobile device (1-*e*) can enter for indoor travel upon removing its cover, a reservation for the cover attaching/removing machine 191 can be set as described above on a screen (not illustrated) as necessary. Once the user arrives at the facility in the autonomous mobile device (1-*d*), the cover thereof is removed by passing through the cover attaching/removing machine 191 without the user needing to alight, and thus the user can enter the facility without needing to alight from the autonomous mobile device (1-*e*).

In the above explanations, the method for setting the boarding site was omitted. However, the boarding site is selected from a registered home or specific site, the current location of the network terminal 161, or the like on a screen (not illustrated).

The embodiments explained above were directed to an example in which the site information database 132, the site coordinates searching means 133, the route planning means 134, the vehicle information database 135, and the operation plan information calculation means 136 are provided to the operation management center 13. However, if these are provided within an application of the network terminal 161 of each user, the communication amount can be reduced, and it is possible to realize the above with similar usage information settings screens. In the present invention, as long as the above functions can be realized, it does not matter where the databases are provided or where the calculations are executed, and these can be appropriately set according to the circumstances of each function.

Next, an example of the flow of the usage operation of the autonomous mobile device will be explained using the example of the flow of the usage operation of the autonomous mobile device of the autonomous mobile device operation system shown in FIG. 8.

First, the user sets reservation information such as the boarding/alighting sites, the boarding time, whether cooperation with another device or information is needed, and the like using the network terminal 161 (step S100). The data that is set is transmitted to the operation management center 13, and the site coordinates searching means 133 searches for the boarding/alighting site information from the boarding/alighting site names (step S101). The operation plan information calculation means 136 then calculates the information necessary for creating an operation plan such as the usage distance and duration (step S102). If the user makes a setting that cooperation with another device/information is needed (step S103), the cooperation object (s) is reserved, and the reservation time is reflected in the usage time of the autonomous mobile device 1 or the usage time of the autonomous mobile device 1 is reflected in the cooperation object reservation time (step S104).

The reservation management means 138 investigates the reservation condition of the autonomous mobile device 1 and whether the coordination object can be reserved, and if they both can be reserved (step S105), the process proceeds to the next step (step S106). If either one cannot be reserved, this is presented to the user through the network terminal 161, and the user can set new usage information.

The autonomous mobile device instruction means 139 reverse calculates the time at which the autonomous mobile device 1 should depart from the waiting area based on the boarding time, and transmits an instruction to the autonomous mobile device 1 at that time to begin traveling toward the boarding site (step S106). When the autonomous mobile device 1 arrives at the boarding site (step S107), it waits for the user to board.

At this time, at a location such as a station rotary where many autonomous mobile devices 1 are called, the autonomous mobile device instruction means 139 transmits a presentation instruction to the network terminal 161 so that the current location of the autonomous mobile device 1 that has been called by the user is presented to the user so that he/she can easily find his/her own autonomous mobile device 1.

Figure 9:
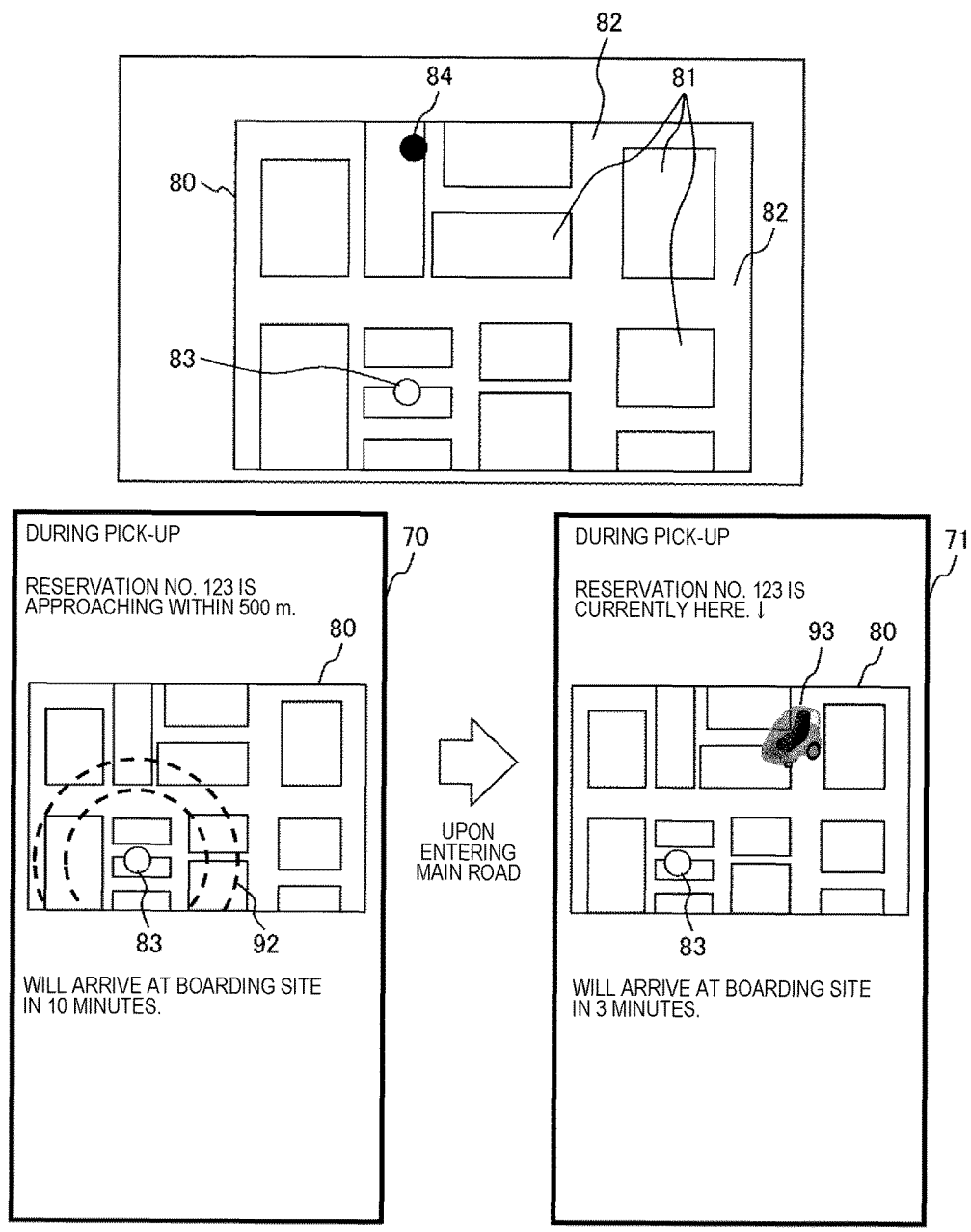
FIG. 9 illustrates an example of presenting a current location of the autonomous mobile device to a user.

The method of presentation mentioned above is illustrated in FIGS. 9 and 10. An area in which the current location is to be displayed is set in advance in the operation management center 13 so that the next user cannot infer the alighting site of a previous user. 80 in FIG. 9 denotes a map screen for setting an area in which the current location is to be displayed. In FIG. 9, a road on which display of the current location should begin is designated in order to have the current location begin to be displayed after the autonomous mobile device 1 enters a main road upon dropping off the previous user. In the screen 80, 81 denotes buildings, the white parts denote narrow roads, and the portions of 82 that are filled with lattice denote the roads where the display is set to begin.

On the map, if 83 denotes the boarding site of the next user and 84 denotes the alighting site of the previous user, the current location is displayed as a rough location from the alighting site 84 which faces a narrow road to the display start road 82. For example, in the screen 70, the current location is displayed as a rough location with concentric circles 92 centered on the boarding location of the next user.

After the autonomous mobile device 1 has entered the display start road 82, a detailed location of the autonomous mobile device 1 is displayed. For example, in the screen 71, the current location is displayed as a detailed location as shown by 93. Once the autonomous mobile device 1 has approached within a certain distance to the boarding site 91, an identical identification mark is presented on both the network terminal 161 and the external display means 4 of the autonomous mobile device 1.

Figure 10:
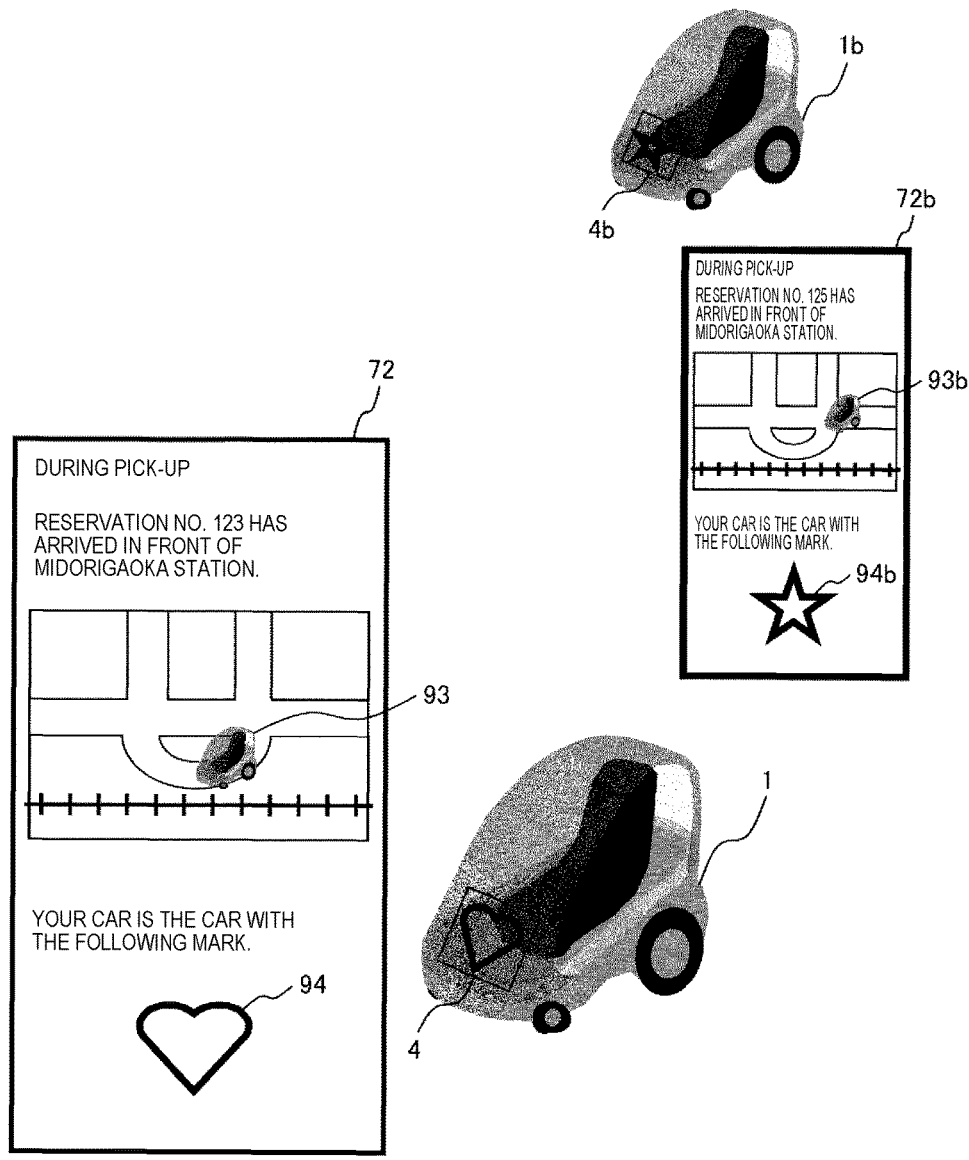
FIG. 10 illustrates an example of presenting a current location of the autonomous mobile device to a user.

For example, the mark is as shown by 94 on the screen 72 and 4 in FIG. 10. The mark is different from that presented on a network terminal screen 72*b* of another surrounding user and that user's autonomous mobile device 1*b*.

Further examples of a condition for switching the display of the current location from a rough location to a detailed location are as follows: switching after the autonomous mobile device 1 has traveled a certain distance or more away from the alighting site of the previous user, switching after the autonomous mobile device 1 has approached within a certain distance to the boarding site of the next user, switching after the autonomous mobile device 1 has dropped off the previous user and then returned once to the waiting area, switching after a certain amount of time or more has passed since the autonomous mobile device 1 dropped off the previous user, and switching after reaching a certain amount of time until the boarding time of the next user. A plurality of these conditions can also be combined.

On the management screen of the operation management center 13, a detailed current location is always displayed regardless of the above conditions.

Figure 8:
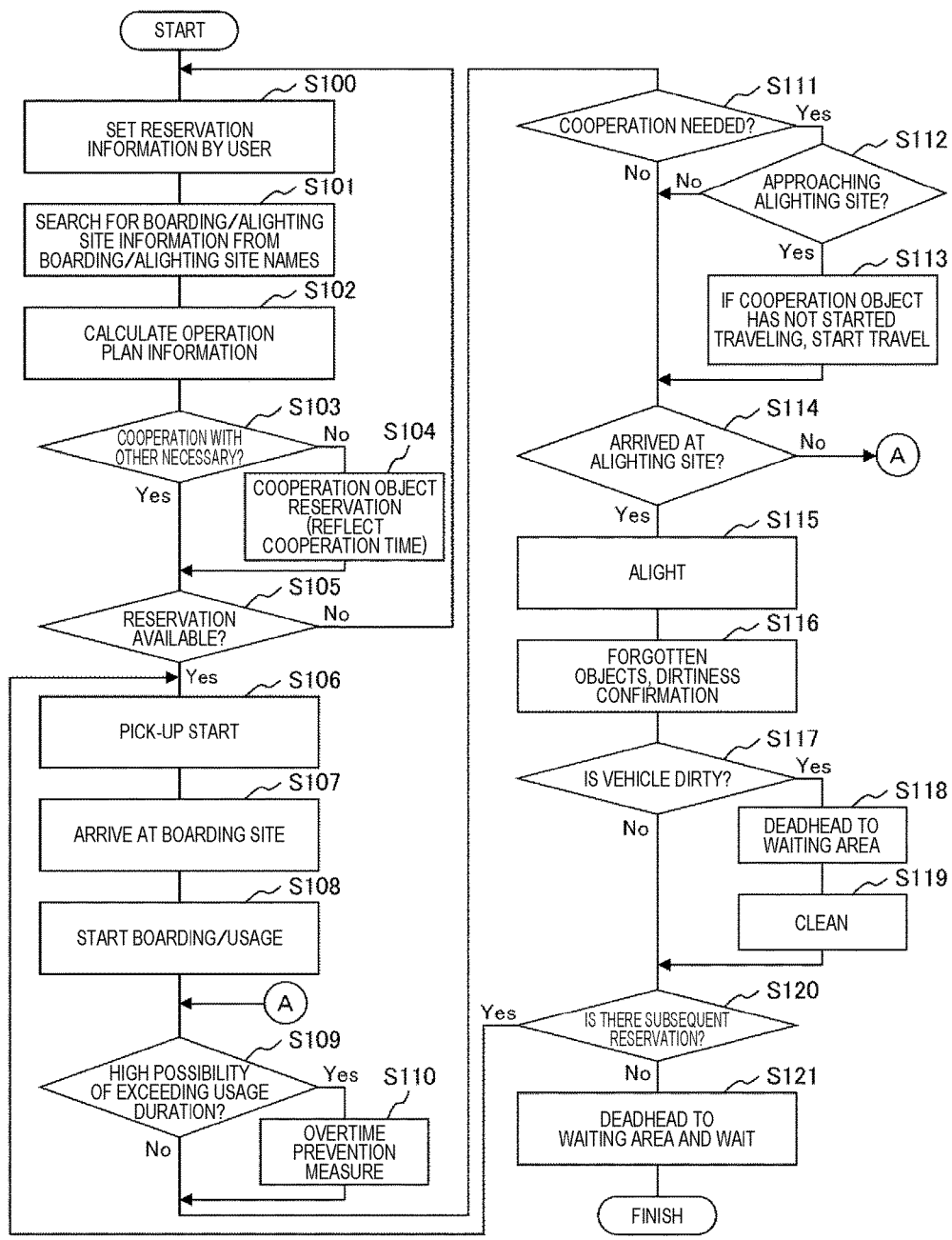
FIG. 8 is a flowchart explaining an example of a flow of a usage operation of the autonomous mobile device.

Returning again to the flow chart of FIG. 8, once the user has boarded and instructed to start travel with a travel start instruction button provided to the information input display means 3 or the like (step S108), travel begins towards a stopover point, an alighting site, or the like.

During travel, the autonomous mobile device instruction means 139 periodically confirms the current location and state of the autonomous mobile device 1. If it determines that there is a high possibility of exceeding the travel duration as described above (step S109), measures for preventing exceeding the usage duration are undertaken as described above (step S100).

Also, if there is a need to cooperate with another device (step S111), once the distance from the current location to the alighting site has reached a certain distance or less (step S112), an instruction is transmitted to the cooperation object to start travel to the cooperation site (step S113).

The autonomous mobile device 1 compares the current location and the alighting site, and it stops once it arrives at the alighting site to wait for the user to alight (step S114). As a method for determining that the user has alighted, an alighting completion button can be provided for the user to press after alighting, or the in-vehicle state detection means 9 can be used to detect that nobody is in the vehicle (step S115).

After alighting, the in-vehicle state detection means 9 detects whether there are any forgotten objects in the vehicle and whether the inside of the vehicle is dirty, and these results are transmitted to the operation management center (step S116). If there are forgotten objects, the autonomous mobile device instruction means 139 causes the network terminal 161 to indicate this.

If the inside of the vehicle is dirty (step S117), the reservation management means 138 transmits a travel instruction to the autonomous mobile device 1 to deadhead to a waiting area 15 equipped with a cleaning device 152 (step S118). After the autonomous mobile device 1 arrives at the waiting area, the cleaning device 152 cleans it (step S119).

If a subsequent reservation for the autonomous mobile device 1 has been booked and it becomes necessary to recreate the usage plan because the autonomous mobile device 1 suddenly has to be cleaned, the reservation management means 138 recreates the usage plan.

If a subsequent reservation exists (step S120), the autonomous mobile device instruction means 139 transmits an instruction to the autonomous mobile device 1 to begin traveling to the next boarding site. If a subsequent reservation does not exist, the autonomous mobile device instruction means 139 transmits an instruction to the autonomous mobile device 1 to deadhead travel to a designated waiting area and wait there until a subsequent reservation is booked (step S121).

The reservation management means 138 can create a usage plan incorporating a cleaning time so that cleaning is carried out after every use. Also, the usage information settings can be configured so that the user can set whether he/she desires to board after cleaning.

Thereby, a discount of the usage fee can be provided to people who make a setting indicating that cleaning is unnecessary, or "no cleaning" can be set in the case that the autonomous mobile device 1 will be consecutively used by another family member after one family member has used it and been dropped off at home.

REFERENCE SIGNS LIST 1 autonomous mobile device
2 communication means
3 information input display means
4 external display means
7 autonomous mobile control means
8 manual operation means
9 in-vehicle state detection means
13 operation management center
14 remote assistance center
15 waiting area
21 autonomous mobile device confirmation means
22 network
132 site information database
133 site coordinates searching means
135 vehicle information database
136 operation plan information calculation means
137 current location storage means
138 reservation management means
139 autonomous mobile device instruction means
152 cleaning device
161 network terminal
172 autonomous mobile wheelchair
181 autonomous mobile cart
191 cover attaching/removing machine
201 network terminal
50 information input menu screen
55 site name selection screen
58 leeway time input screen
51 site name and cooperation method input screen
80 current location display area setting screen

The invention claimed is:

1. An operation system for an autonomous mobile device, comprising:
an autonomous mobile device that controls a travel mechanism to travel to destination site coordinates;
a use-assisting tool with which a user designates starting site coordinates, destination site coordinates, and a usage time;
an operation management center that causes the autonomous mobile device to travel to a destination designated by the use-assisting tool,
wherein the operation management center is configured to:
periodically obtain a current location and state information from the autonomous mobile device;
plan a route from the starting site coordinates to the destination site coordinates;
calculate a distance and time when traveling the route;
calculate an energy needed for travel and determine a feasibility of the route based on results thereof as well as a usage time and an estimated energy remaining in the autonomous mobile device to execute travel reservation management of the autonomous mobile device; and
provide an instruction to travel the route to the autonomous mobile device;
a site information database that coordinates site names and site coordinates;
wherein the operation management center is configured to search for the starting site coordinates and the destination site coordinates from the site information database based on a starting site name and a destination site name designated by the user,
wherein the operation management center adds a leeway time designated by the user to information that serves as a basis for determining a feasibility of travel, and
a user interface with which the user can modify speed, temporarily stop autonomous travel, restart the autonomous travel, travel manually, and switch between manual travel and autonomous travel is provided to the autonomous mobile device,
wherein state information that is periodically obtained from the autonomous mobile device includes a traveling state and speed information,
wherein the operation management center is configured to calculate an estimated time of arrival at the destination site coordinates from the current location of the autonomous mobile device and the destination site coordinates, and presents an exceedance prevention measure to the user when a difference between the calculated estimated time of arrival at the destination site coordinates and an original estimated time of arrival at the destination site coordinates is within a certain time or when the estimated time of arrival at the destination site coordinates is later than the original estimated time of arrival at the destination site coordinates, and wherein the operation management center is configured to urge a speed increase when the speed has been lowered or urge a restart of travel when the autonomous mobile device has stopped, and to notify the user when a subsequent reservation has been booked.

2. The operation system for an autonomous mobile device according to claim 1, wherein the site information database includes data related to a cooperation device and cooperation information at each site and data describing an association between the cooperation device and cooperation information, and a usage time of the autonomous mobile device, in a case that at least either one of a cooperation device or cooperation information exists at the destination designated by the use-assisting tool, when the cooperation device or cooperation information affects the usage time of the autonomous mobile device, the operation management center makes a reservation for use of the cooperation device or the cooperation information and determines the usage time of the autonomous mobile device based on results thereof, and in the case that the cooperation device or cooperation information is affected by the usage time of the autonomous mobile device, the operation management center makes a reservation for use of the cooperation device or the cooperation information based on the usage time of the autonomous mobile device.

3. The operation system for an autonomous mobile device according to claim 1, wherein the operation management center indicates to the user the current location of the autonomous mobile device during travel toward the starting site, the operation management center displays a detailed location when any one or more of preset conditions including: the autonomous mobile device travels a set distance or more away from an alighting site of a previous user, or the autonomous mobile device enters within a set distance from the starting site, or a set time or more has passed from an alighting time of a previous user, or the autonomous mobile device reaches a preset road is satisfied, and when none of the above conditions are satisfied, the operation management center displays a rough location.

4. The operation system for an autonomous mobile device according to claim 1, wherein the operation management center transmits a command corresponding to a state obtained from the autonomous mobile device, and retransmits the command periodically until the state obtained from the autonomous mobile device switches to a state that should be reached after the command.

5. The operation system for an autonomous mobile device according to claim 1, wherein in a case that periodic current location and state information could not be obtained from the autonomous mobile device, the operation management center predictively calculates the current location of the autonomous mobile device on the route from a planned traveling speed and records the current location, and when duration of time during which the current location and state information cannot be periodically obtained from the autonomous mobile device reaches or exceeds a certain continuous duration of time, the operation management center searches surroundings from a current location that was last obtained to a current location that was most recently predicted.

6. An autonomous mobile device that controls a travel mechanism in accordance with route coordinates to travel to destination site coordinates, wherein conditions related to moving and conditions related to a destination are reflected on the travel of the autonomous mobile device, and the conditions related to moving include an original time required for moving and a leeway time desired by a user, the autonomous mobile device comprising:

a user interface with which a user designates starting site coordinates, destination site coordinates, and a usage time;

wherein the autonomous mobile device is configured to plan a route from the starting site coordinates to the destination site coordinates;

calculate a distance and time when traveling the route; and calculate an energy needed for travel and determine a feasibility of the route based on results thereof as well as a usage time and an estimated energy remaining in the autonomous mobile device to execute travel reservation management of the autonomous mobile device;

wherein the user designates site names of the starting site and the destination site and designates a leeway time with the user interface; and a site information database that coordinates the site names and the site coordinates;

wherein the autonomous mobile device is configured to search for the starting site coordinates and the destination site coordinates from the site information database based on a starting site name and a destination site name designated by the user, wherein the autonomous mobile device adds the leeway time designated by the user to information that serves as a basis for determining a feasibility of travel, wherein the user can modify speed, temporarily stop autonomous travel, restart the autonomous travel, travel manually, and switch between manual travel and autonomous travel with the user interface, wherein state information that is periodically obtained from the autonomous mobile device includes a traveling state and speed information, wherein the autonomous mobile device calculates an estimated time of arrival at the destination site coordinates from the current location of the autonomous mobile device and the destination site coordinates, and presents an exceedance prevention measure to the user when a difference between the calculated estimated time of arrival at the destination site coordinates and an original estimated time of arrival at the destination site coordinates is within a certain time or when the estimated time of arrival at the destination site coordinates is later than the original estimated time of arrival at the destination site coordinates, and wherein the autonomous mobile device is configured to urge a speed increase when the speed has been lowered or urge a restart of travel when the autonomous mobile device has stopped, and to notify the user when a subsequent reservation has been booked.

* * * * *